July 31, 1923.

G. W. KADEL

LANDING CARRIAGE FOR AEROPLANES

Filed Oct. 6, 1921

1,463,471

2 Sheets-Sheet 1

Inventor
G. W. Kadel
By Jack A. Schley
Attorney

July 31, 1923. 1,463,471
G. W. KADEL
LANDING CARRIAGE FOR AEROPLANES
Filed Oct. 6, 1921 2 Sheets-Sheet 2

Inventor
G. W. Kadel
By
Attorney

Patented July 31, 1923.

1,463,471

UNITED STATES PATENT OFFICE.

GEORGE W. KADEL, OF DALLAS, TEXAS.

LANDING CARRIAGE FOR AEROPLANES.

Application filed October 6, 1921. Serial No. 505,775.

*To all whom it may concern:*

Be it known that I, GEORGE W. KADEL, a citizen of the United States, residing at Dallas, in the county of Dallas and State of Texas, have invented certain new and useful Improvements in Landing Carriages for Aeroplanes, of which the following is a specification.

This invention relates to new and useful improvements in landing carriages for aeroplanes.

The object of the invention is to provide a carriage, the wheel of which may be retracted within the thickness of the wings so as to conceal the same and also to eliminate the resistance offered to the air by the landing carriage in flight. A particular object of the invention is to provide retractable wheels located to be retracted into the wings at points removed from the body or fuselage, whereby the tread of the landing carriage may be increased and is not limited by the width of the fuselage. In large passenger carrying aeroplanes a wide tread for the landing carriage is essential.

A further object is to obviate sockets and recesses in the fuselage, which are employd where the wheels retract into the fuselage; also to avoid connection of the landing carriage with the fuselage so as not to limit the tread.

A construction designed to carry out the invention will be hereinafter described together with other features of the invention.

Figure 1:
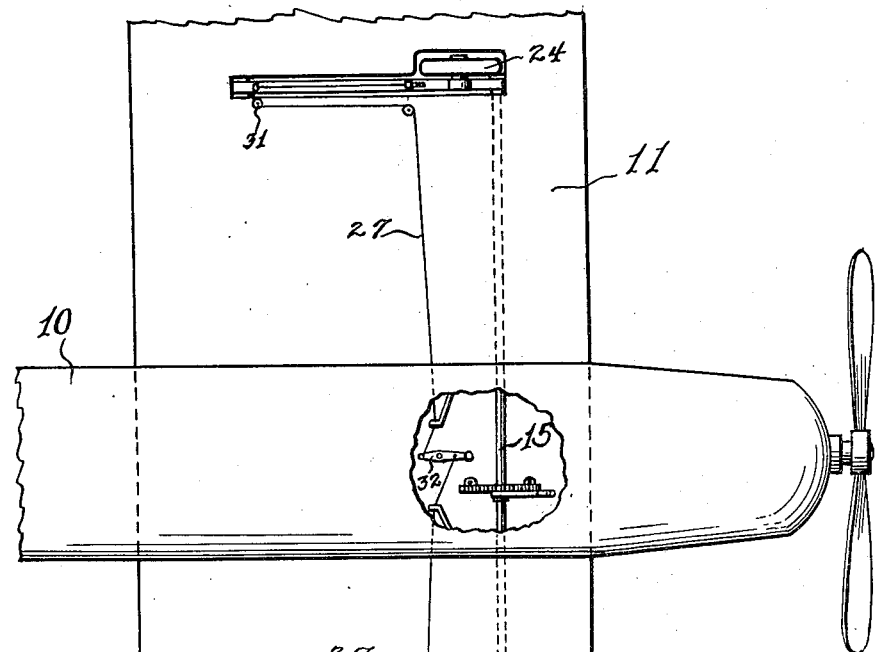
Figure 7:
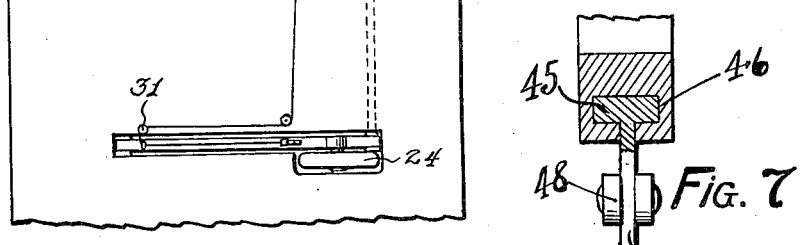
Figure 6:
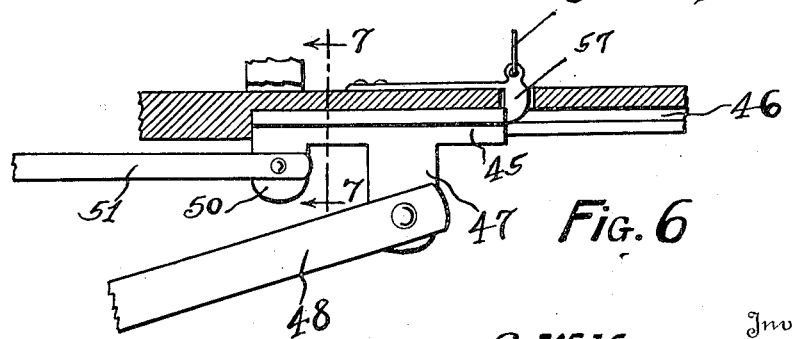
Figure 2:
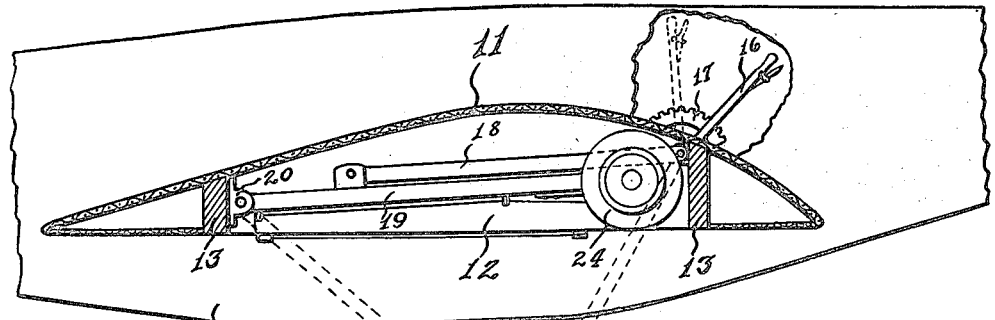
Figure 4:
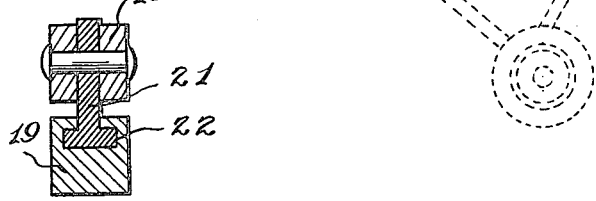
Figure 3:
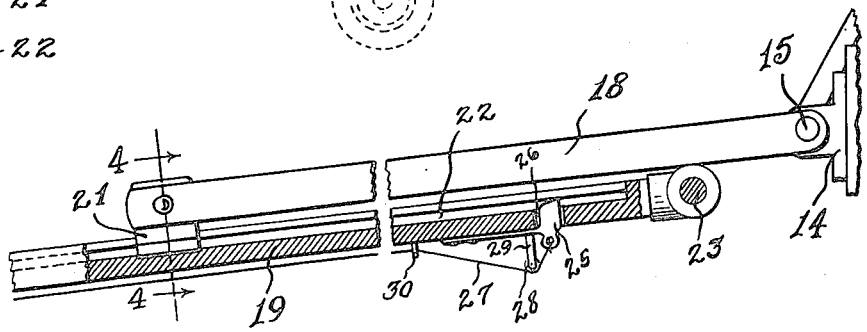
Figure 5:
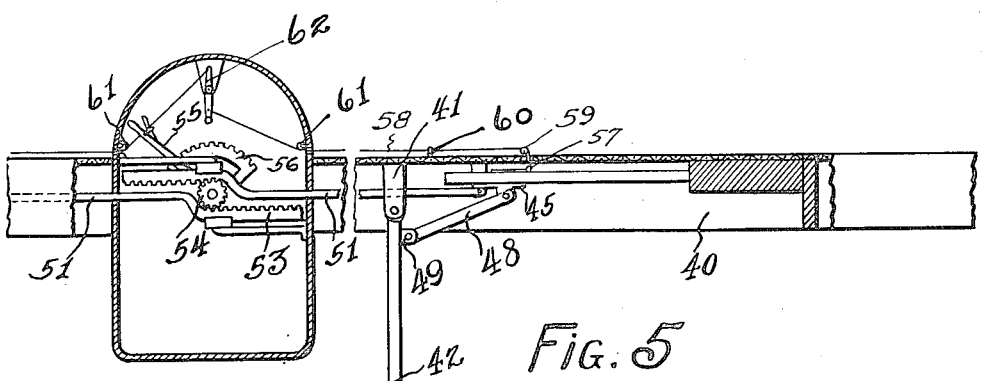

The invention will be more readily understood from a reading of the following specification and by reference to the accompanying drawings, in which an example of the invention is shown and wherein:

Fig. 1 is an underside view of a portion of an aeroplane equipped with a landing carriage embodying my invention, Fig. 2 is a partial side elevation of the same, one of the wings being shown in section and the landing carriage being shown extended in dotted lines, Fig. 3 is a sectional detail of the struts retracted, Fig. 4 is a cross section taken on the line 4—4 of Fig. 3, Fig. 5 is a cross sectional view thru the fuselage and wings showing a modified form of retracting mechanism, Fig. 6 is a detail of the latch for the modification, and Fig 7 is a cross section on the line 7—7 of Fig. 6.

In the drawings the numeral 10 designates a fuselage and 11 the wings extending from each side thereof. At a point spaced from the fuselage, a recess 12 is provided in the underside of each wing and into each of these recesses, a wheel and its supports are retracted, so as to substantially fill the recess and offer no resistance during flight.

At each end of the recess of each wing are cross members 13. To the upper portion of each front member 13 is secured a bearing bracket 14 in which is mounted a rock shaft 15. This shaft extends thru the fuselage and has a lever 16 secured thereto and by which it may be rocked. The lever co-operates with a locking segment 17 whereby the lever may be fastened in adjusted positions.

The ends of the shaft project beyond the brackets and upon each end is fastened the upper end of a forward strut 18, each of which is associated with a rear strut 19 pivoted to a bracket 20 secured to the rear member 13. At its outer end each strut 18 is pivoted to the web of a flanged shoe 21 which rides in a correspondingly shaped channel 22 in the rear strut 19. When the strut 18 is swung up into the recess the shoe slides in the channel 22 upwardly of the rear strut 19 and thus swings said strut 19 into the recess directly under the strut 18, as is shown in Fig. 2.

On the outer end of each strut 19 an axle 23 is secured and the usual landing wheel 24 is journaled on said axle. The wheel and associated parts are fully retracted into each recess and so held by the lever 16 and segment 17.

When the lever 16 is released the wheels will swing downwardly in the channels. Each strut 19 has a spring latch 25 projecting thru an opening 26 into the path of the shoe which rides over, and catches under said latch when the shoe reaches the limit of its downward movement. This locks each pair of struts in the form of a V-shaped brace with the wheel at the apex thereof. The struts cannot collapse until the latches are released. It will be seen that the wheels may be spaced as far from the fuselage as is desired, and any desired width of tread, thus had. Further the fuselage is not obstructed or reduced by recesses for the wheels.

For releasing each latch a flexible connection 27 is attached to each latch and passed outwardly over a small pulley 28 mounted in a bracket 29 on the strut 19. The connection is passed thru eyes 30 on each strut so as to enter the wing at a point immediately adjacent the pivot of the strut 19 and thus obviate elongation of the connection when the struts are swung. Each connection passes forwardly in the wing along the side of the recesses and is carried over pulleys 31 so as to be extended to the fuselage. An arm 32 is centrally pivoted in the fuselage and has the connections 27 attached to its opposite ends. The arm is provided with a lever which when swung in a counter clockwise direction will exert a pull on the connections sufficient to withdraw the latches. When the latches are withdrawn the struts may be swung upwardly by rocking the shaft 15 by means of the lever 16 and are held in the recesses 12 during flight.

In Figs. 5, 6 and 7, I have shown a modified form which includes a recess 40 directed longitudinally of each wing in contradistinction to the recesses 12 which are directed transversely of the wings. In each recess 40 a hanger 41 is mounted and a strut 42 has its upper end pivoted in said hanger, while its lower end is offset and carries an axle 43 on which a wheel 44 is journaled. The recess may be located at the desired distance from the fuselage. The strut is pivoted in the inner end of the recess and swings upwardly and outwardly into the recess.

A flanged shoe 45 is slidable in a correspondingly shaped channel 46 in the top of each recess. The shoe has a web 47 depending from the channel and to which the upper end of a brace strut 48 is pivoted. The strut 48 is comparatively short and has its lower end pivoted to an ear 49 on the upper portion of the strut 42. The shoe has an ear 50 at its inner end depending from the channel.

A pitman 51 is provided for each shoe and has its outer end pivoted to the ear 50. These pitmen have their inner ends provided with gear bars 53 engaging on opposite sides of a pinion 54, within the fuselage. The pinion is connected with a lever 55 which operates in conjunction with a locking segment 56. When the lever is swung the pinion is revolved and the pitmen moved in opposite directions.

When the lever 55 is swung to the left the pitmen working within the wings pull the shoe 45 inwardly toward the fuselage, whereby the struts 42 are swung downwardly by the struts 48. As each shoe approaches the inner end of its movement it rides under a spring latch 57 which latches in front of the outer end of the shoe. The shoes being thus locked, the struts cannot move or the landing carriage cannot collapse until said latches are released. As in the case of the latches 25, any suitable means may be employed for releasing the same.

For releasing the latches 57, flexible connections 58 may be used. Each connection has its outer end attached to one of the latches and passes up over a pulley 59 and thru a guide 60. The connections enter the fuselage and are carried upwardly over pulleys 61. The ends of the connections within the fuselage are connected to a lever 62 on opposite sides of its pivot, so that by swinging said lever in a clockwise direction, the connections are pulled and the latches are released so that the lever 55 may then be swung to retract the landing carriage.

It will be seen that the tread of the carriage may be governed by the spacing the struts from the fuselage and as no braces or connections are had with the fuselage, the tread is not limited. Only the space necessary for the operating means, is occupied in the fuselage and the lines of the same are not changed. The recesses are of such size as to snugly receive the landing carriage elements and are not large enough to effect the function of the wings.

Various changes in the size and shape of the parts, as well as modifications may be made without departing from the spirit of the invention.

What I claim, is:

1. In an aeroplane, the combination of a fuselage, wings extending from the fuselage, wings extending from the fuselage and each having a recess in its underside, a pair of struts hinged in each wing recess, a ground wheel carried by one of the struts, a sliding shoe co-acting with each pair of struts, and a spring latch engaged by the shoe for locking the struts in landing position.

2. In an aeroplane, the combination of a fuselage, wings extending from the fuselage, and each having a recess in its underside, a pair of struts hinged in each wing recess, a ground wheel carried by one of the struts, a sliding shoe co-acting with each pair of struts, a spring latch engaged by the shoe for locking the struts in landing position, and means for releasing the latches from a point within the fuselage.

In testimony whereof I affix my signature.

GEORGE W. KADEL.